(No Model.)
J. GRESHAM.
VACUUM AUTOMATIC BRAKE APPARATUS.
No. 516,863. Patented Mar. 20, 1894.
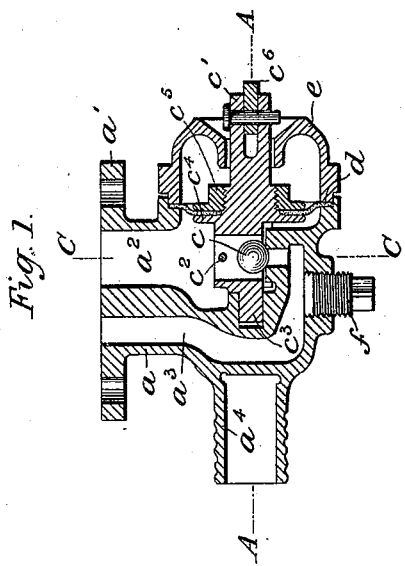
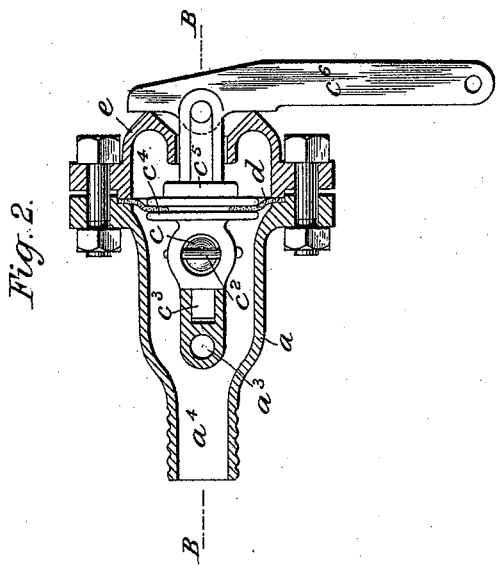
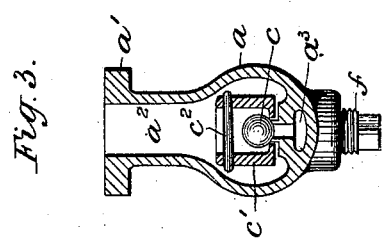
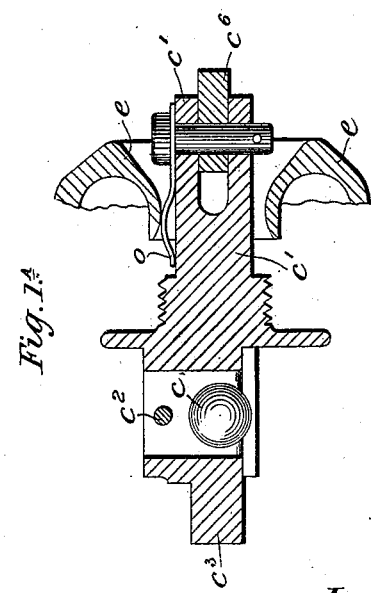
Witnesses:
Harbert Blossom
Peter A. Ross
Inventor:
James Gresham
by Henry Connett
his Attorney.

UNITED STATES PATENT OFFICE.

JAMES GRESHAM, OF MANCHESTER, ASSIGNOR TO THE VACUUM BRAKE COMPANY, LIMITED, OF LONDON, ENGLAND.

VACUUM AUTOMATIC BRAKE APPARATUS.

SPECIFICATION forming part of Letters Patent No. 516,863, dated March 20, 1894.

Application filed May 23, 1892. Serial No. 433,959. (No model.)

*To all whom it may concern:*

Be it known that I, JAMES GRESHAM, engineer, a subject of the Queen of Great Britain and Ireland, of the firm of Gresham & Craven, Limited, of Craven Iron Works, Salford, Manchester, in the county of Lancaster, England, have invented new and useful Improvements in or Applicable to Vacuum Automatic Brake Apparatus, (in respect whereof I have applied for but not yet obtained Letters Patent in Great Britain, No. 22,019, to bear date December 16, 1891,) of which the following is a specification.

This invention relates to the construction of the ball-valve gear for controlling vacuum brake apparatus, the same being arranged in such a manner that, when taken apart, the ball cannot be lost or damaged, and, when put together again, the parts cannot be improperly assembled in consequence of inadvertency or want of knowledge on the part of the workman.

In ordinary ball-valve apparatus, the ball is dropped through a normally-closed aperture in the casing into a hole or cavity in the movable stem by which the ball is pulled off its seating; the stem passing through a diaphragm employed for enabling the pressure of the atmosphere to restore the parts to their original positions.

According to the present improved mode of construction, the ball is carried and retained in the hole or cavity in the movable stem; the hole or cavity being large enough to allow perfect freedom of action when the ball is being lifted from or is falling back to its seating. The slot or channel on the lower side of the stem is of less width than the diameter of the ball. The ball, however, acts freely, as its seating projects into the aperture. Inasmuch as the ball can only pass partly through the aperture; and is retained on the side opposite to the aperture by a removable cross-pin, it cannot fall out of the hole or cavity when the stem is withdrawn from the casing. That part of the stem containing the hole or cavity for the ball is on one side of the axis of the stem, which prevents the stem from being inserted in the guiding hole in the casing except when it is the proper side up. This also insures that the lever for actuating the stem when the ball is to be moved out of its working position, which lever is pivoted to the stem, shall be in its correct place.

In the accompanying drawings, Figure 1 is a vertical section, on the line B B (Fig. 2), of the improved ball-valve mechanism. Fig. 1<sup>A</sup> shows an addition sometimes employed in hot climates. Fig. 2 is a corresponding horizontal section on the line A A (Fig. 1). Fig. 3 is a vertical section, on the line C C (Fig. 1), looking toward the left.

The casing $a$ of the ball-valve mechanism has a flange $a'$ by means of which it is united to the brake-cylinder, the passage $a^2$ communicating with the under side and the passage $a^3$ with the upper side of the piston in the vacuum-chamber. The nozzle $a^4$ of the casing $a$ is adapted to receive one end of the flexible tube which connects it with the train-pipe, the latter extending from end to end of the train. There is a branch from the passage of the nozzle $a^4$ on each side of the passage $a^3$; these branches communicating with the passage $a^2$ above the ball-valve. When air is withdrawn from the train-pipe, air from the upper side of the brake-piston flows through the passage $a^3$ and by the ball-valve $c$ to the passage $a^2$, thence to the passage $a^4$ and, through the flexible tube, to the train-pipe. Air from the under side of the piston can also flow at the same time along the passages $a^2$ and $a^4$ and through the tube to the train-pipe. Thus the brake-cylinder on both sides of the piston is exhausted more or less, and the piston can descend to its lowest position, in which position the brake-blocks are withdrawn from the wheels.

When air is admitted from the atmosphere to the train-pipe, it flows through the flexible tube and passages $a^4$ and $a^2$ to the under side of the piston, but it cannot enter the vacuum-chamber which incloses the upper end of the brake-cylinder; the vacuum on the upper side of the piston being therefore maintained, because the ball-valve $c$ is kept closed by the pressure of the incoming air, and communication through the passage $a^3$ is intercepted. The pressure of the atmosphere, acting on the lower side of the piston, lifts the same, thereby applying the brake-blocks. The ball-valve $c$ is retained in the hole or cavity in the movable stem $c'$ by the cross-pin $c^2$. The seating for the ball is formed in the casing $a$, and projects upward into a slot or channel on the under side of the hole in the stem; the slot or channel not being wide enough to allow the ball $c$ to escape when the stem is withdrawn from the casing.

The central part of the flexible diaphragm $d$ is held between a collar $c^4$ on the stem and a nut $c^5$ screwed on the end of the stem; the margin of the diaphragm being secured between facings formed upon the casing $a$ and the part $e$, which is attached to flanges on the casing $a$ by bolts and nuts. The outer extremity of the stem $c'$ is jointed to a lever $c^6$ extending across the dished end of the part $e$, so that the lever $c^6$, when pulled either way, acts against the edge of the dished end, which serves as a fulcrum. When the stem $c'$ is drawn outward by moving the lever $c^6$, the side of the hole or cavity in the stem is brought against the ball $c$ and pushes it off its seating; thereby admitting air from the train-pipe to the brake-cylinder above the piston. The lever $c^6$ may be manipulated by a cord attached to it at the hole in its extremity. This lever is not required in the ordinary working of the brakes, but is furnished in order that, after the engine has been detached from the train and air has, in consequence, been admitted to the brake-cylinder, thus putting the brakes on, air can also be admitted to the vacuum chamber, thus re-establishing equilibrium and taking the brakes off. The annular space between the part $e$ and the stem $c'$ effects communication between the outer side of the diaphragm $d$ and the atmosphere, so that atmospheric pressure can force the diaphragm $d$ inward, when there is a more or less perfect vacuum in the passage $a^2$, and bring the stem into the position shown in Figs 1 and 2, in which position the hole in the stem is concentric with the ball-valve $c$.

The screw-plug $f$ is used for closing a hole which gives access to the passage $a^3$; this hole also serving to enable the core of the passage $a^3$ to be supported in the mold during the operation of casting.

If, while air is being exhausted from the train-pipe $b$, the valve $l$ allows air, entering by way of the valve $n$, to leak past it into the train-pipe to such an extent as to interfere with the ejector creating sufficient vacuum, the lever $n^4$ should be turned so as to draw down the valve $n$ air-tight against its seating; leakage past the valve $l$, being thus prevented.

When the ball-valve mechanism is required for use in hot climates, where the heat is sufficient to harden the diaphragm $d$, it is desirable to place between the stem $c'$, and the dished end of the part $e$, a friction-spring $o$, which serves to retain the ball valve either in the open or in the closed position.

Having now particularly described and ascertained the nature of this invention and in what manner the same is to be performed, I claim—

In ball-valve apparatus for controlling vacuum automatic brakes, the combination, with a ball-valve $c$, a movable stem $c'$, for unseating that valve, a cavity in the stem wherein the said valve works, a pin $c^2$ across the cavity above the ball, and a slot in the bottom of the cavity having sides which serve to support the ball when the stem is withdrawn from its guiding hole, of the casing $a$ containing the guiding hole for the stem $c'$, and a seating for the ball-valve $c$ projecting upward from the casing into the slot on the under side of the cavity in the stem, substantially as herein set forth.

JAMES GRESHAM.

Witnesses:
G. E. BECKETT,
H. E. GRESHAM.